United States Patent
Sombatsiri

(10) Patent No.: US 12,488,568 B2
(45) Date of Patent: Dec. 2, 2025

(54) INFORMATION PROCESSING APPARATUS WHICH REDUCES COMPUTATION OPERATIONS, INFORMATION PROCESSING METHOD, AND COMPUTER READABLE MEDIUM

(71) Applicant: NEC Corporation, Tokyo (JP)

(72) Inventor: Salita Sombatsiri, Tokyo (JP)

(73) Assignee: NEC CORPORATION, Tokyo (JP)

( * ) Notice: Subject to any disclaimer, the term of this patent is extended or adjusted under 35 U.S.C. 154(b) by 441 days.

(21) Appl. No.: 18/007,784

(22) PCT Filed: Jun. 5, 2020

(86) PCT No.: PCT/JP2020/022405
§ 371 (c)(1),
(2) Date: Dec. 2, 2022

(87) PCT Pub. No.: WO2021/245942
PCT Pub. Date: Dec. 9, 2021

(65) Prior Publication Data
US 2023/0237770 A1    Jul. 27, 2023

(51) Int. Cl.
*G06V 10/771* (2022.01)
*G06T 5/20* (2006.01)

(52) U.S. Cl.
CPC .............. *G06V 10/771* (2022.01); *G06T 5/20* (2013.01)

(58) Field of Classification Search
None
See application file for complete search history.

(56) References Cited

U.S. PATENT DOCUMENTS

| | | | |
|---|---|---|---|
| 10,325,179 B1 * | 6/2019 | Kim | G06N 3/084 |
| 11,551,027 B2 * | 1/2023 | Fu | G06V 10/764 |
| 11,593,587 B2 * | 2/2023 | Lee | G06V 10/764 |
| 2018/0365794 A1 * | 12/2018 | Lee | G06N 3/048 |
| 2019/0304102 A1 | 10/2019 | Chen et al. | |
| 2019/0311202 A1 | 10/2019 | Lee et al. | |
| 2019/0379589 A1 | 12/2019 | Ryan et al. | |

(Continued)

FOREIGN PATENT DOCUMENTS

| | | | |
|---|---|---|---|
| CN | 115497004 A | * | 12/2022 |
| CN | 115546474 A | * | 12/2022 |
| JP | 2020-064333 A | | 4/2020 |

OTHER PUBLICATIONS

Anvarov, & Kim, & Song,. (2020). Action Recognition Using Deep 3D CNNs with Sequential Feature Aggregation and Attention. Electronics. 9. 147. 10.3390/electronics9010147. (Year: 2020).*

(Continued)

*Primary Examiner* — Ian L Lemieux
(74) *Attorney, Agent, or Firm* — Sughrue Mion, PLLC

(57) ABSTRACT

An object is to provide an information processing apparatus capable of reducing redundant computation in CNN. An information processing apparatus according to the present disclosure includes at least one memory configured to store an instruction, and at least one processor configured to execute the instruction to use mask channel in input feature maps to mask pixels of feature channels in the input feature maps and to generate masked feature channels, and perform a convolution operation between the masked feature channels and convolution kernel to generate output feature maps.

9 Claims, 19 Drawing Sheets

(56) References Cited

U.S. PATENT DOCUMENTS

| | | | |
|---|---|---|---|
| 2020/0012904 A1 | 1/2020 | Zhao et al. | |
| 2020/0143204 A1* | 5/2020 | Nakano | G06V 10/82 |
| 2021/0264557 A1* | 8/2021 | Mao | G06T 1/20 |
| 2022/0351333 A1* | 11/2022 | Navarrete Michelini | G06T 3/4046 |
| 2023/0206456 A1* | 6/2023 | Lee | G06V 10/764 382/266 |
| 2023/0410481 A1* | 12/2023 | Guo | G06V 10/776 |
| 2024/0013504 A1* | 1/2024 | Yu | G06V 10/80 |
| 2025/0046063 A1* | 2/2025 | Badowski | G06V 10/454 |

OTHER PUBLICATIONS

He, K., Gkioxari, G., Dollár, P., & Girshick, R. (2017). Mask r-cnn. In Proceedings of the IEEE international conference on computer vision (pp. 2961-2969). (Year: 2017).*

Sombatsiri, S., Shibata, S., Kobayashi, Y., Inoue, H., Takenaka, T., Hosomi, T., . . . & Takeuchi, Y. (2019). Parallelism-flexible convolution core for sparse convolutional neural networks on FPGA. IPSJ Transactions on System and LSI Design Methodology, 12, 22-37. (Year: 2019).*

Ren, S., He, K., Girshick, R., & Sun, J. (2015). Faster r-cnn: Towards real-time object detection with region proposal networks. Advances in neural information processing systems, 28. (Year: 2015).*

C. -F. Liou, P. Kuo and J. -I. Guo, "Residual Knowledge Retention for Edge Devices," 2021 IEEE 30th International Symposium on Industrial Electronics (ISIE), Kyoto, Japan, 2021, pp. 1-6, doi: 10.1109/ISIE45552.2021.9576374. (Year: 2021).*

Dai, J., He, K., & Sun, J. (2015). Convolutional feature masking for joint object and stuff segmentation. In Proceedings of the IEEE conference on computer vision and pattern recognition (pp. 3992-4000). (Year: 2015).*

Zhang, K., Li, T., Liu, B., & Liu, Q. (2019). Co-saliency detection via mask-guided fully convolutional networks with multi-scale label smoothing. In Proceedings of the IEEE/CVF conference on computer vision and pattern recognition (pp. 3095-3104). (Year: 2019).*

Anonymous. Stack Overflow. Asked Oct. 13, 2016. Accessed Aug. 7, 2025. Available at <https://stackoverflow.com/questions/40012749/can-cnn-learn-to-weigh-certain-feature-channels-much-much-more-than-others> (Year: 2016).*

International Search Report for PCT Application No. PCT/JP2020/022405, mailed on Sep. 8, 2020.

Written opinion for PCT Application No. PCT/JP2020/022405, mailed on Sep. 8, 2020.

Figurnov et al., "Spatially Adaptive Computation Time for Residual Networks", CVPR2017, 2017.

Yu et al., "Combining Background Subtraction and Convolutional Neural Network for Anomaly Detection in Pumping-Unit Surveillance", Algorithms 2019, May 29, 2019.

Wang et al., "SkipNet: Learning Dynamic Routing in Convolutional Networks", ECCV 2018, 2018.

Wu et al., "BlockDrop: Dynamic Inference Paths in Residual Networks", CVPR 2018, 2018.

Lin et al., "Focal Loss for Dense Object Detection", ICCV 2017, 2017.

Liu et al., "SSD: Single Shot MultiBox Detector", ECCV 2016, Dec. 29, 2016.

* cited by examiner

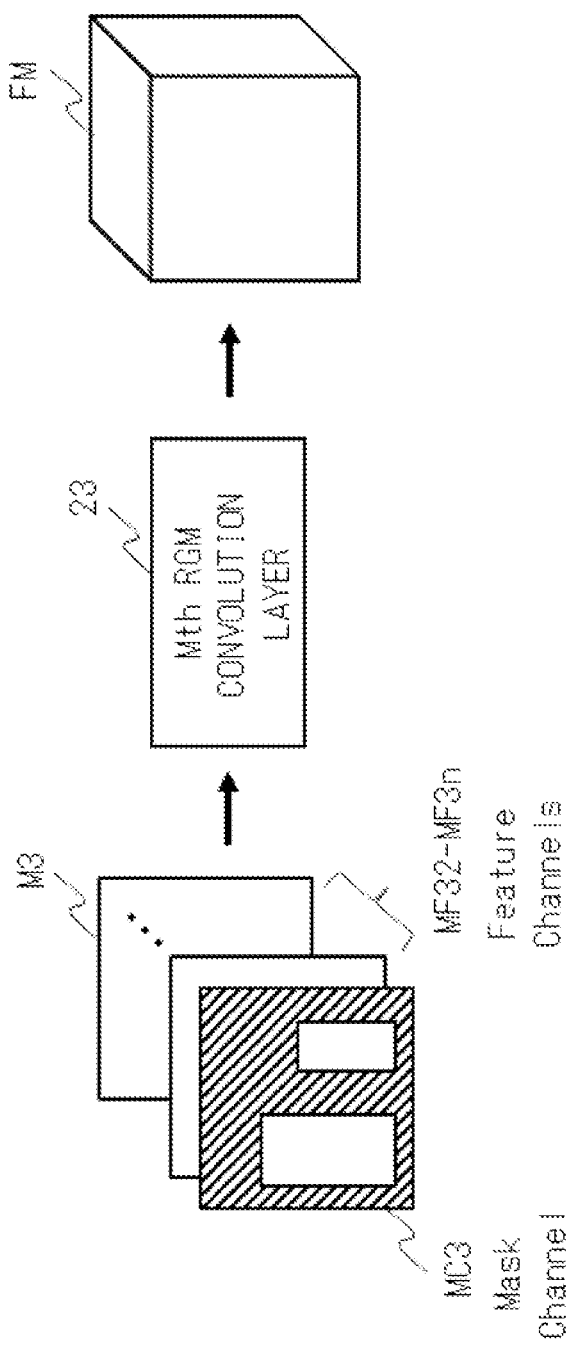

INFORMATION PROCESSING APPARATUS WHICH REDUCES COMPUTATION OPERATIONS, INFORMATION PROCESSING METHOD, AND COMPUTER READABLE MEDIUM

This application is a National Stage Entry of PCT/JP2020/022405 filed on June 5, 2020, the contents of all of which are incorporated herein by reference, in their entirety.

TECHNICAL FIELD

The present disclosure relates to an information processing apparatus, an information processing method, and a non-transitory computer readable medium.

BACKGROUND ART

Convolutional Neural Networks (CNN) provide superior results for several computer vision tasks such as classification and object detection. For that reason, they have become popular and are deployed in real-life applications in the field of image recognition and video analytics, such as face recognition, surveillance systems, etc.

The most compute-intensive parts of the CNN are convolutional layers. Since the convolution takes place for every pixel of an input image and feature maps, some of the computations are redundant, such as the background area of the image.

Non-Patent Literature 1 (NPL 1) discloses an adaptive computation time method for accelerating the inference processing of the CNN by computing a halting score for each pixel in a layer. This halting score indicates the redundant pixels that can be omitted from computation.

CITATION LIST

Non Patent Literature

NPL 1: Figurnov et al., "Spatially Adaptive Computation Time for Residual Networks", CVPR2017, 2017

SUMMARY OF INVENTION

Technical Problem

However, the method disclosed in NPL 1 has two problems: (1) the halting score is computed with extra matrix multiplication or convolution layers within the CNN, which is compute-intensive and consumes function call overhead; (2) it cannot omit the background area that has complicated details.

An object of the present disclosure is to provide an information processing apparatus, an information processing method, and a non-transitory computer readable medium capable of reducing redundant computation in the CNN.

Solution to Problem

In a first example aspect, an information processing apparatus includes: at least one memory configured to store an instruction, and at least one processor configured to execute the instruction to use mask channel in input feature maps to mask pixels of feature channels in the input feature maps and to generate masked feature channels; and perform a convolution operation between the masked feature channels and convolution kernels to generate output feature maps.

In a second example aspect, an information processing method includes: using mask channel in input feature maps to mask pixels of feature channels in the input feature maps and to generate masked feature channels; and performing a convolution operation between the masked feature channels and convolution kernels to generate output feature maps.

In a third example aspect, a non-transitory computer readable medium storing a program to causes a computer to execute: using mask channel in input feature maps to mask pixels of feature channels in the input feature maps and to generate masked feature channels; and performing a convolution operation between the masked feature channels and convolution kernels to generate output feature maps.

Advantageous Effects of Invention

According to the present disclosure, it is possible to provide an information processing apparatus, an information processing method, and a non-transitory computer readable medium capable of reducing redundant computation in the CNN.

BRIEF DESCRIPTION OF DRAWINGS

FIG. 9B is a figure illustrating the operation of the third example embodiment of the present disclosure;

EXAMPLE EMBODIMENT (Outline of Convolution Layer Processing)

Prior to explaining embodiments according to this present disclosure, an outline of computations in the convolution layer is explained with reference to FIGS. 13 to 15B.

Figure 13:
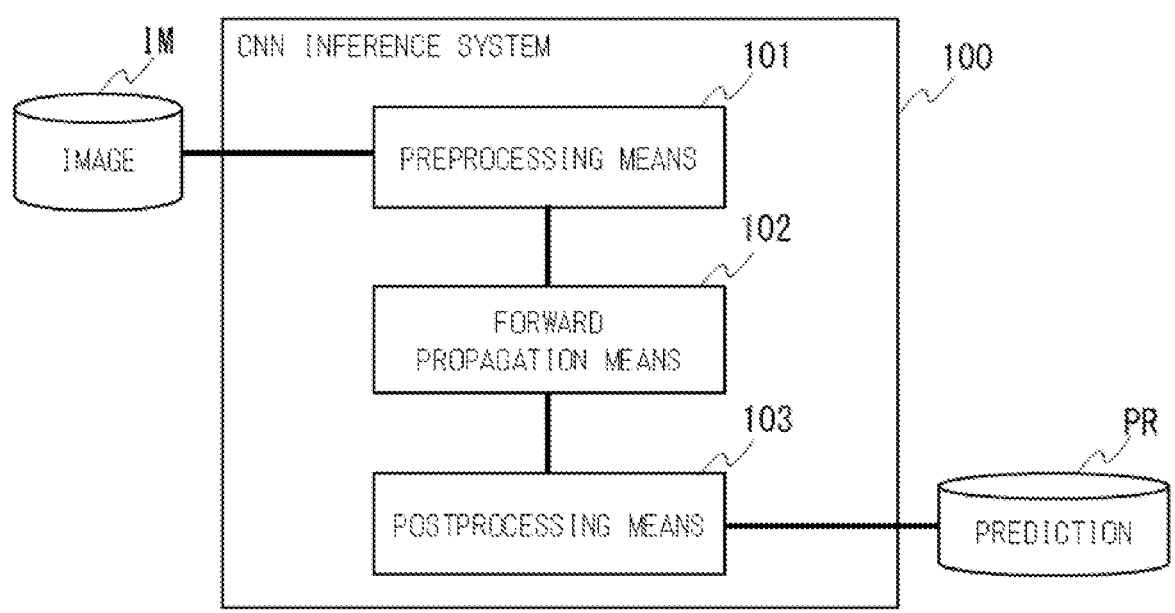
FIG. 13 is a configuration diagram illustrating the flow of the operation of a related art.

In general, an application deploys a CNN inference system 100 as shown in FIG. 13. An input image IM is a single or multi-channel image data. First, the input image IM is preprocessed by a preprocessing means 101. The preprocessing means 101 may perform image resizing, pixel value normalization, image cropping, background subtraction, etc. Then, a forward propagation means 102 propagates the preprocessed image in order to generate the results through the CNN, which does the inference processing. Finally, a postprocessing means 103 performs postprocessing on the result of the forward propagation and yields a prediction PR as the output of the system 100. The postprocessing may include, but not is limited to, non-maximal suppression and etc. The prediction PR shows an answer of the image recognition or video analytics of the system 100. The prediction PR depends on the task of the system 100. For example, the prediction PR of a classification task is a class of objects in the input image, the prediction PR of an object detection task is Bounding Boxes (BBoxes: boxes surrounding each object) and classes of one or a plurality of objects in the input image, and etc.

Figure 14A:
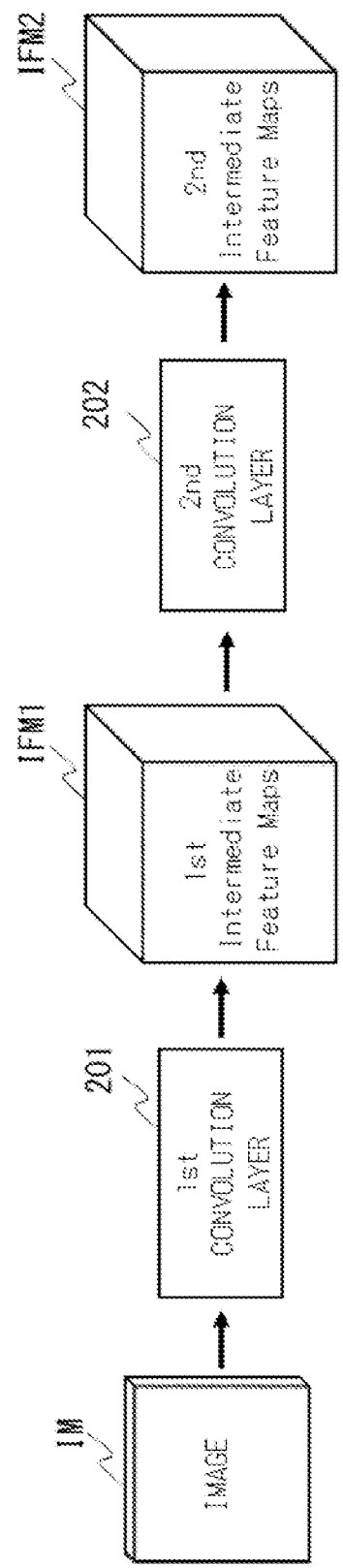
FIG. 14A is a figure illustrating the operation of the related art.
Figure 14B:
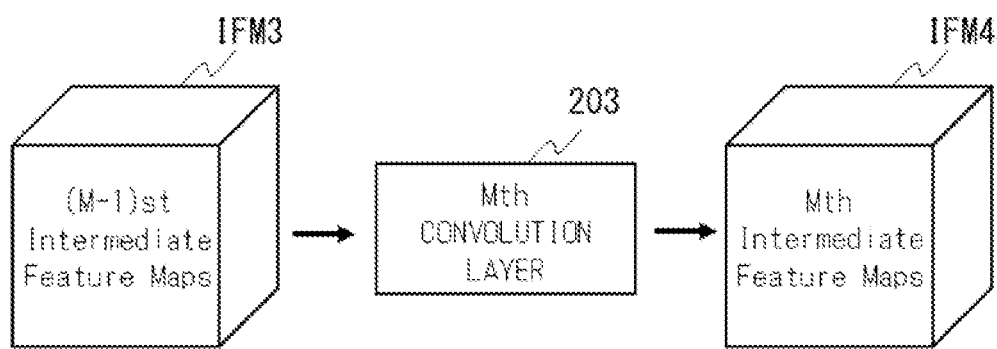
FIG. 14B is a figure illustrating the operation of the related art.

The CNN inference system 100 is composed of one or a plurality of convolution layers. FIGS. 14A and 14B show an overview of the CNN's forward propagation means 102. An image IM is fed to the input layer of the CNN. The forward propagation analyses the entire image to detect and/or classify the objects in the image. First, the first convolution layer 201 generates one or a plurality of intermediate feature maps IFM1, which represent the features of the image IM, called feature channels. The second to the Mth convolution layers operate in a manner similar to that of the first convolution layer 201 in order to generate intermediate feature maps IFM2~IFM4. The CNN can also include other kinds of layers, e.g. a subsampling (pooling) layer, batch-normalization layer, non-linear activation function layer, fully-connected layer, etc., in order to improve accuracy.

Figure 15A:
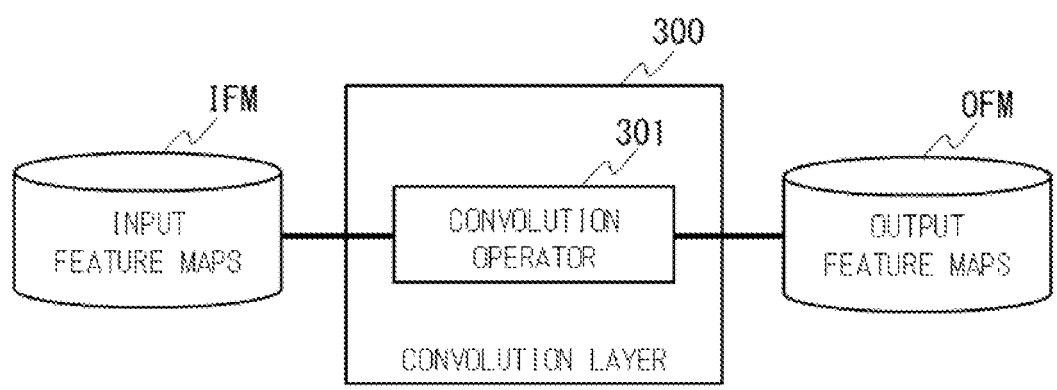
FIG. 15A is a block diagram illustrating the structure of a CNN Inference System.
Figure 15B:
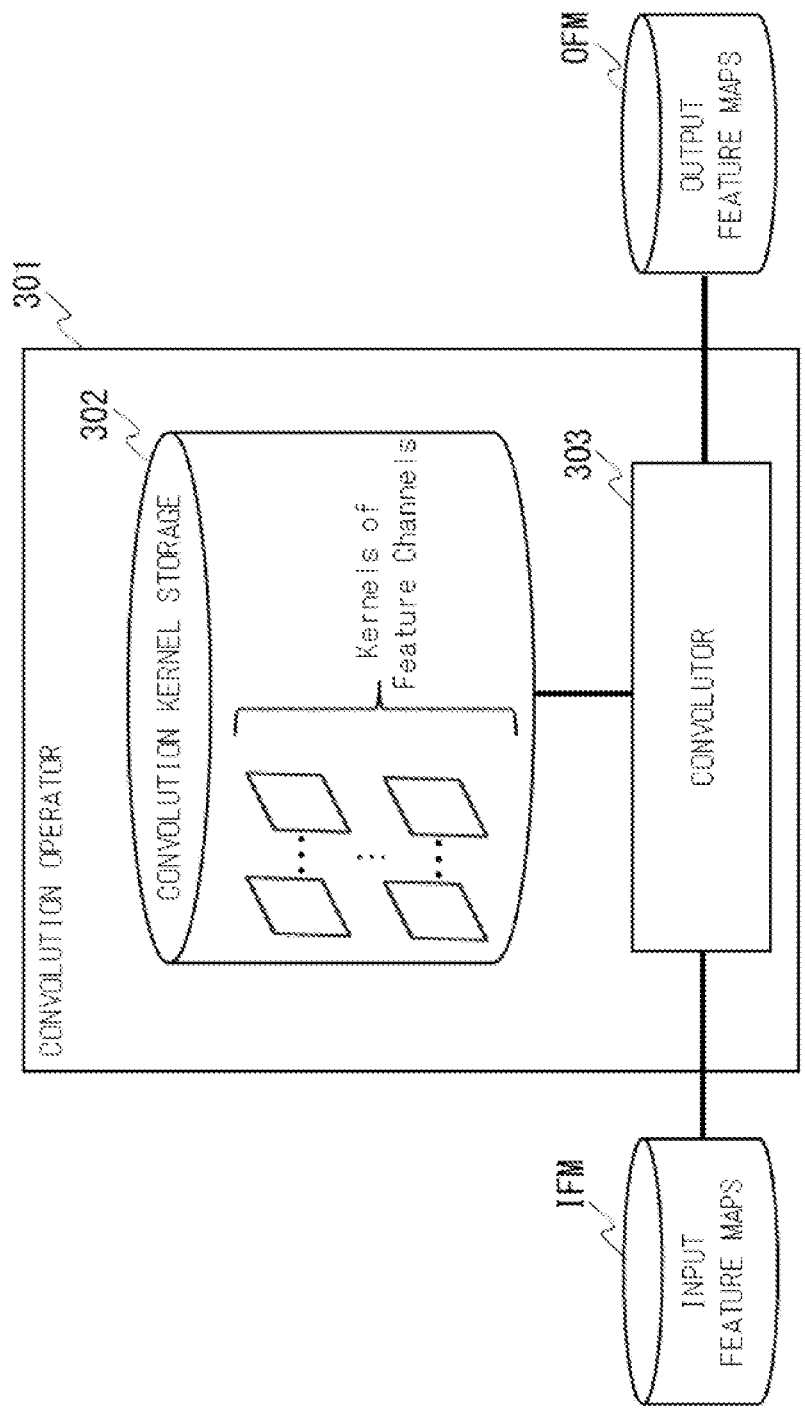
FIG. 15B is a block diagram illustrating the structure of the CNN Inference System.

Referring to FIG. 15A, a convolution layer 300 performs convolution by a convolution operator 301 on an input feature maps (IFM) to generate an output feature maps (OFM). Referring to FIG. 15B, the convolution operator 301 includes a convolution kernel storage 302, which stores one or a plurality of kernels of feature channels for generating the features, and the convolutor 303 that performs convolution.

Although the CNN provides superior results, it causes a problem: the CNN is compute-intensive so that computation in the CNN causes a bottleneck in the system. In FIG. 13, the bottleneck of the system 100 is the means 102. As the applications advance, the network becomes deeper and engages an enormous amount of computation so that it is hard to process in real-time.

The most compute-intensive parts of the CNN are the convolution layers. The convolution takes place for every pixel of the input image and feature maps. In other words, the convolution layers include a large amount of multiply-accumulate (MAC) operations. Therefore, some of the computations are redundant, such as the background area of the image.

NPL 1 discloses the method which tries to omit the MAC operations, however, as mentioned before, it has the following problems: (1) the halting score is computed with extra matrix multiplication or convolution layers within the CNN, which is compute-intensive and consumes function call overhead; (2) it cannot omit the background area that has complicated details. Regarding the problem (1), since the method requires a separate fully-connected or convolution layers to compute a decision, it introduces not only computational overhead, but also function call overhead on certain accelerators. Regarding the problem (2), since the cost function focuses on analyzing the texture of objects rather than the objects itself, it cannot omit the background area with complicated details.

"Combining Background Subtraction and Convolutional Neural Network for Anomaly Detection in Pumping-Unit Surveillance", Yu et al., Algorithms 2019, 2019 discloses a method that applies background subtraction and foreground object extraction before predicting a class of object with the CNN in order to remove the CNN computation of the background. However, this method has two problems: (1) it is not suitable for a dynamic background; (2) in the case that objects overlap, the overlap area is computed several times, and hence is redundant. Regarding (1), the reason why the method is not suitable for a dynamic background is that the background subtraction is effective only for a static background.

United States Patent Application Publication Number US2019/0304102 A1 and United States Patent Application Publication Number US2019/0311202 A1 disclose methods that suppress the computation of a frame with the BBox of the previous frame. However, these methods can be problematic for high-speed dynamic objects and the mask generated from the previous frame cannot capture the movement of objects.

"SkipNet: Learning Dynamic Routing in Convolutional Networks", Wang et al., ECCV2018, 2018 and "BlockDrop: Dynamic Inference Paths in Residual Networks", Wu et al., CVPR2018, 2018 disclose a network, aka gating network in SkipNet and policy model in BlockDrop to determine which residual block of Residual Network (ResNet) can be omitted during an inference phase of each input data. However, there are three problems with these networks: (1) they require either extra CNN or extra matrix multiplication or convolution layers; (2) they are limited to ResNet Family-CNN, which has residual blocks; (3) skipping the whole residual block is too coarse-grained for some tasks such as object detection.

United States Patent Application Publication Number US2020/0012904 A1 discloses a loss function of a mask for semantic segmentation. However, the term 'mask' in the method means the classification of objects by pixels of the image, and this method does not focus on the decision of computing or omitting the pixels within the CNN.

Example embodiments of the present disclosure are described in detail below referring to the accompanying drawings. These embodiments are applicable to system and apparatus deploying the CNN. The present disclosure is applicable to applications such as image classification and object detection. However, the applications of the present disclosure are not limited to classification and object detection, but also include other applications for which the CNN is used.

First Example Embodiment

First, an information processing apparatus 1 according to a first example embodiment is explained with reference to FIG. 1.

Figure 1:
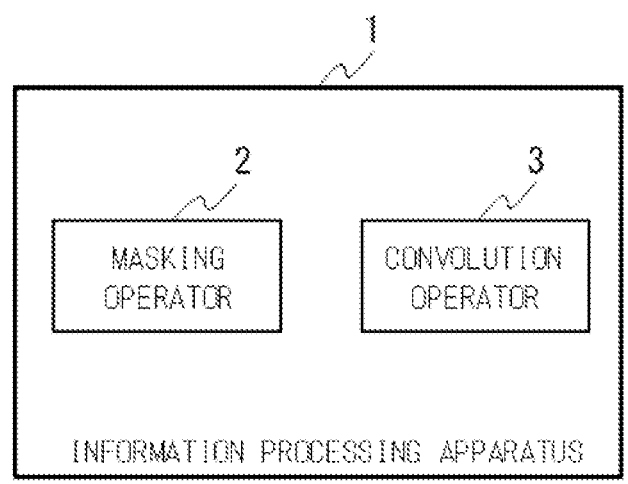
FIG. 1 is a configuration diagram illustrating the structure of a first example embodiment of the present disclosure.

Referring to FIG. 1, the first example embodiment of the present disclosure, an information processing apparatus 1, includes a masking operator (masking operation means) 2 and a convolution operator (convolution operation means) 3. The information processing apparatus 1 can be used for the CNN.

The masking operator 2 uses mask channel in input feature maps to mask pixels of feature channels in the input feature maps and generate masked feature channels. The convolution operator 3 performs a convolution operation between the masked feature channels and convolution kernels to generate output feature maps.

The structure shown in FIG. 1 can be performed by software and hardware installed in an information processing apparatus 1. The input feature maps and output feature maps can be stored either inside or outside the information processing apparatus 1.

(Description of Effect)

Next, the effect of the present example embodiment is described. As mentioned above, the masking operator 2 uses mask channel in input feature maps to mask pixels of feature channels in the input feature maps and generate masked feature channels, which are used for the convolution operation. Therefore, since redundant areas of the masked feature channels are masked, the computations related to those pixels are omitted. This helps to reduce redundant computation in the CNN.

Second Example Embodiment

First, a second example embodiment of the disclosure is described below referring to the accompanying drawings.

(Explanation of Structure)

Figure 2:
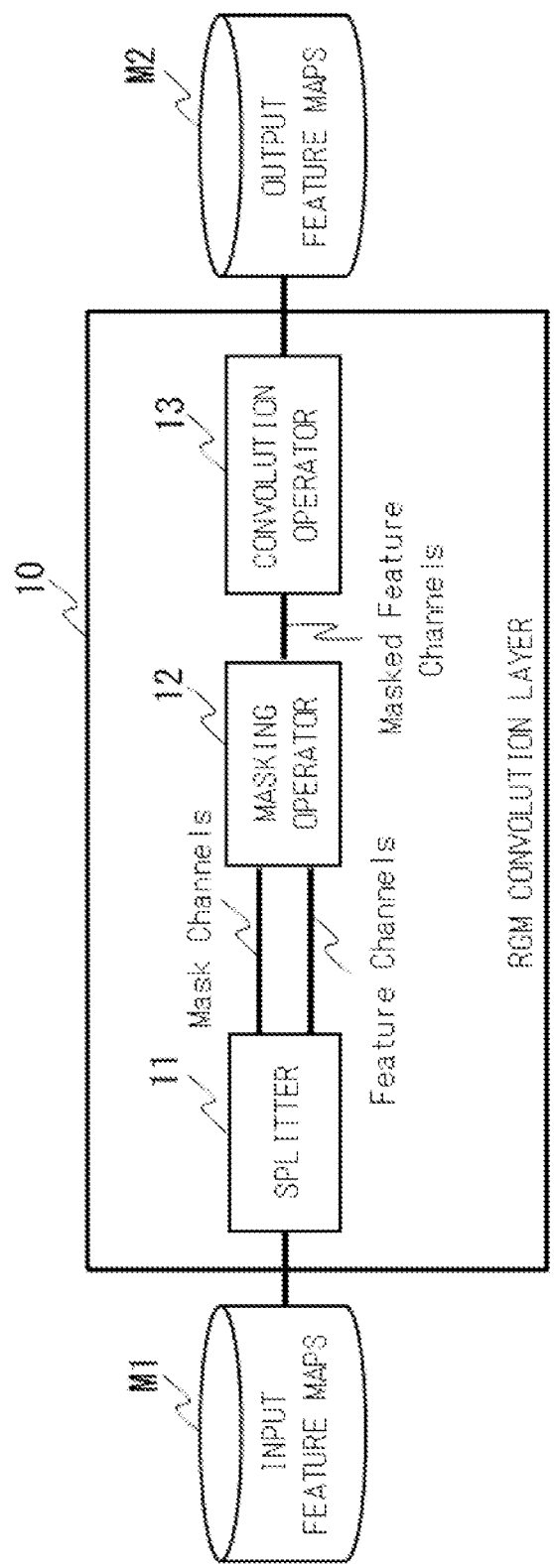
FIG. 2 is a configuration diagram illustrating the structure of a second example embodiment of the present disclosure.

Referring to FIG. 2, which shows the second example embodiment of the present disclosure, a Region-Masked (RGM) convolution layer 10 includes a splitter 11, a masking operator 12, and a convolution operator 13. This example embodiment explains the structure and operations of the forward propagation for inference processing. The RGM convolution layer 10 can be implemented for using, but is not limited to, a general-purpose processor system or a specific circuit, such as Graphic Processing Unit (GPU), Application-Specific Integrated Circuit (ASIC) and Application-Specific Instruction set Processor (ASIP), and a reconfigurable device, such as Field Programmable Gate Array (FPGA).

The RGM convolution layer 10 uses one or a plurality of mask channels of its input feature maps to omit redundant computation and generates one or a plurality of feature maps, which includes mask channels and feature channels to be used as input of a next layer. Input and Output of the RGM convolution layer 10 are a multi-channel input feature maps M1 and output feature maps M2, respectively. The input feature maps M1 can be multi-dimensional tensor of any type of data.

Figure 3:
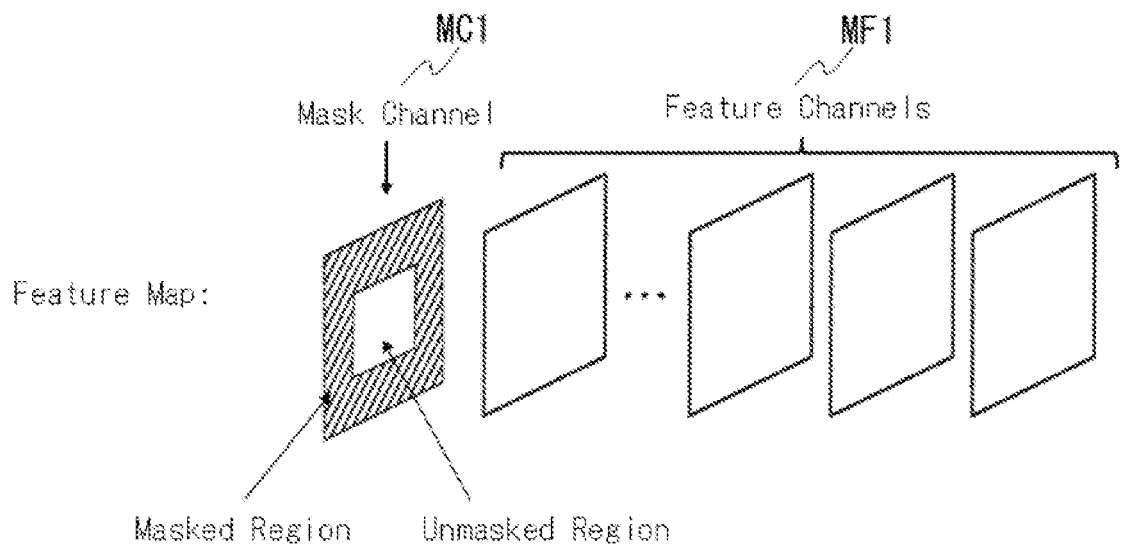
FIG. 3 is a figure illustrating the structure of a feature map of RGM-CNN.

As shown in FIG. 3, the feature maps include one or a plurality of mask channels MC1 and one or a plurality of feature channels MF1. The mask channels MC1 are for indicating the pixels that can be omitted from the convolutional computation. In FIG. 3, this masked region is shown as a hatched area, while an unmasked region is shown as an unhatched area. The feature channels MF1 represents the feature values.

The structure shown in FIG. 2 can be performed by software and hardware installed in an information processing apparatus or system. The input feature maps M1 and output feature maps M2 can be stored in a temporary or permanent memory device in the information processing apparatus or system. However, the input feature maps M1 can instead be installed outside of the information processing apparatus or system, and the information processing apparatus or system can send the output feature maps M2 to another information processing apparatus or system. The RGM convolution layer 10 can be composed by a collaboration of software and hardware.

The RGM convolution layer 10 is capable of using channels within input feature maps to omit the spatially redundant computations of the convolution layer and generate output feature maps. This output feature maps includes mask channels that can be used to omit the computation of the next layer and the feature channels.

The above-mentioned means generally operate as follows.

The splitter 11 splits the input feature maps M1 into mask channels MC1 and feature channels MF1.

The masking operator 12 uses the mask channels MC1 to mask the pixels of the feature channels MF1 to generate a masked feature channel.

The convolution operator 13 performs a convolution operation between the masked feature channels and kernels of the RGM convolution layers in order to generate the output feature maps M2.

Figure 4:
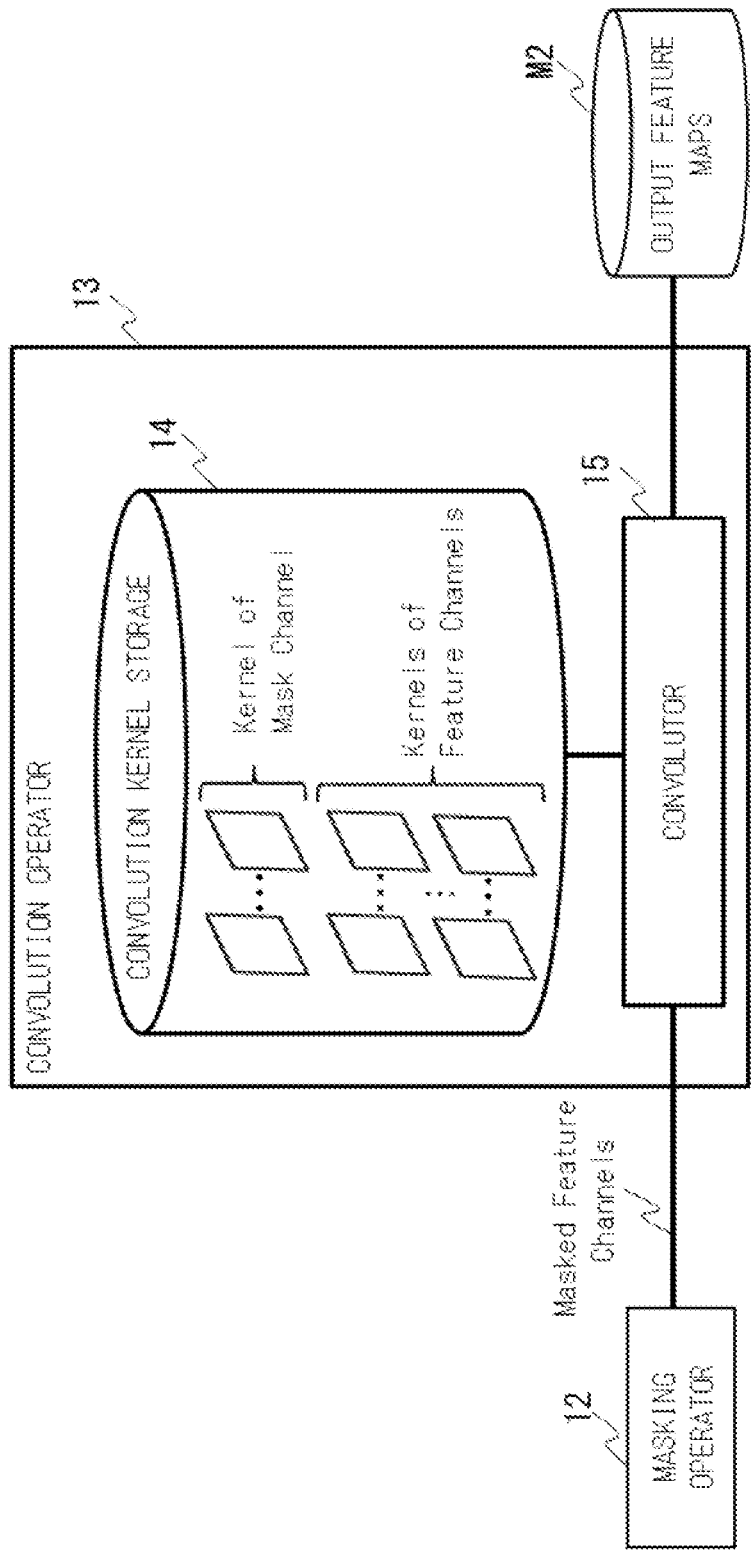
FIG. 4 is a configuration diagram illustrating the structure of a convolution operator of the second example embodiment of the present disclosure.

Referring to FIG. 4, the convolution operator 13 includes a convolution kernel storage 14 and a convolutor 15. FIG. 4 and other figures of this example embodiment illustrate the case where there is only one mask channel for each RGM convolution layer, however there can be a plurality of mask channels for each RGM convolution layer. The means operates as follows.

The convolution kernel storage 14 operates as a storage for kernels of the RGM convolution layers (convolution kernels). The kernels include one or a plurality of kernels of mask channels for generating the mask channels of the output feature maps M2 and one or a plurality of kernels of feature channels for generating feature channels of the output feature maps M2. The convolution kernel storage 14 can be implemented as a buffer using, but not limited to, registers, Static Random-Access Memory (SRAM), Dynamic Random-Access Memory (DRAM), etc.

The convolutor 15 performs convolution with the kernels in the convolution kernel storage 14 across the masked feature channels. The masked pixels can be omitted from the convolution computation, and hence reduce the number of computations.

(Description of Operation)

Next, referring to the flowchart in FIG. 5, the general operation of the present example embodiment will be described.

Figure 5:
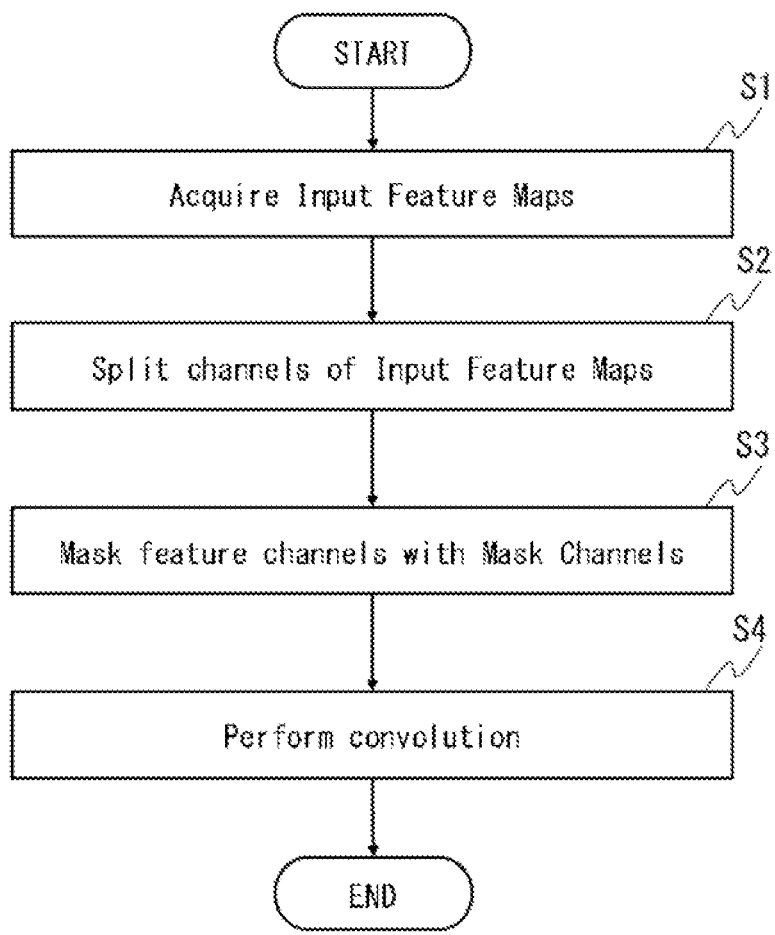
FIG. 5 is a flow diagram illustrating the flow of the operation of the second example embodiment.
Figure 6:
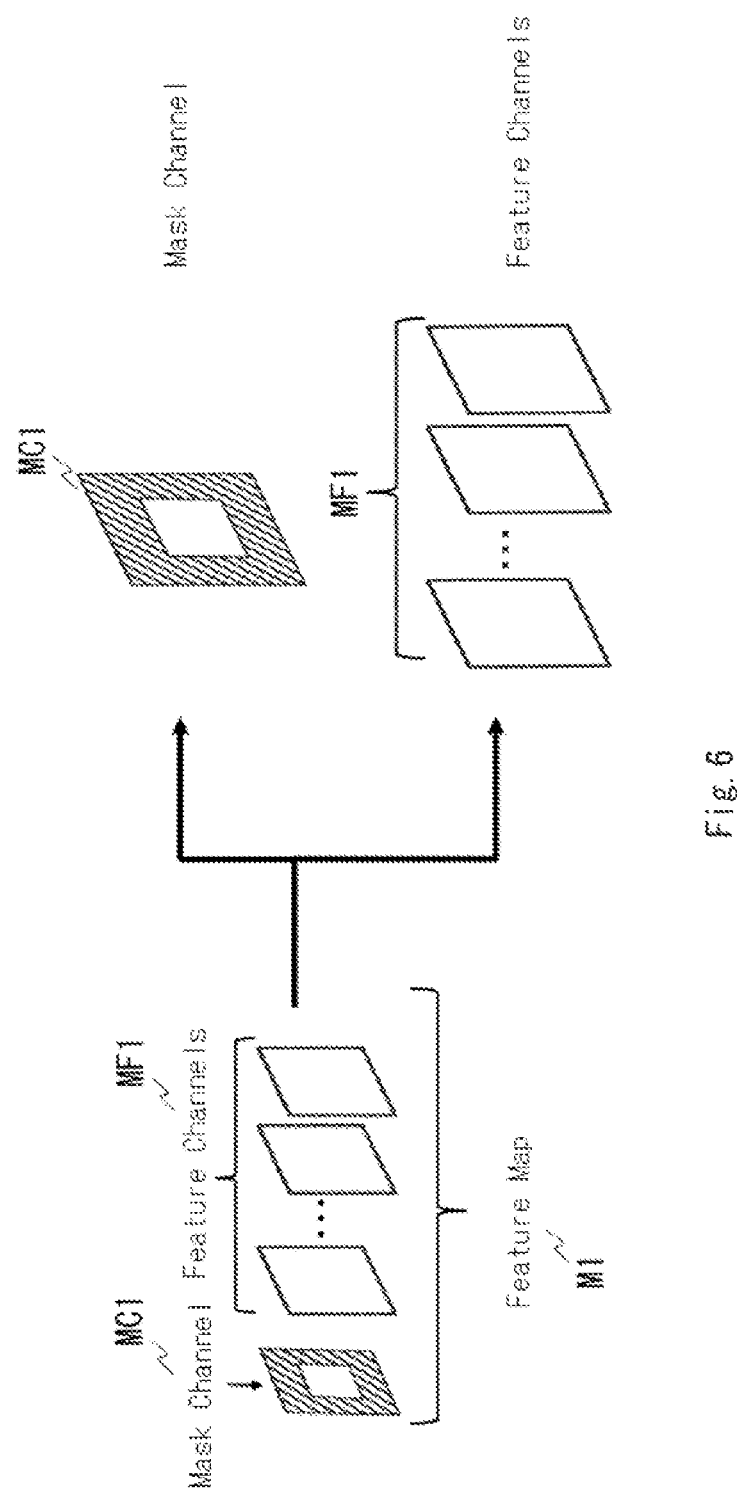
FIG. 6 is a figure illustrating the operation of splitting channels of input feature maps of the second example embodiment of the present disclosure.

First, the splitter 11 acquires input feature maps M1 (step S1 in FIG. 5) and splits the input feature maps M1 into mask channels MC1 and feature channels MF1 (step S2 in FIG. 5) as shown in FIG. 6. The splitter 11 then sends these channels to the masking operator 12.

Figure 7:
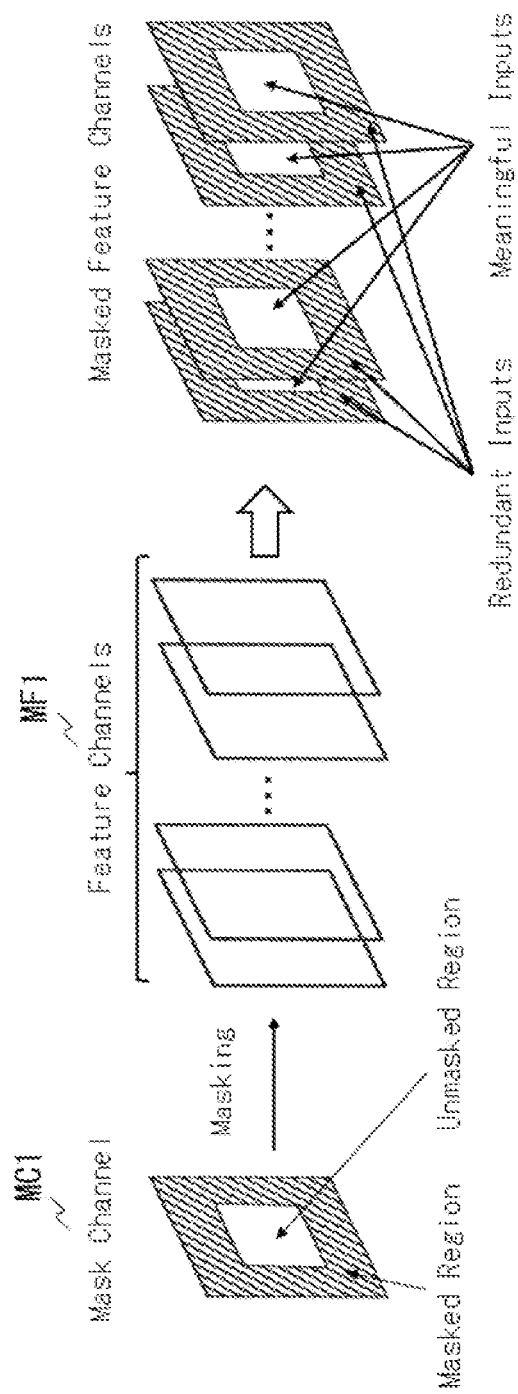
FIG. 7 is a figure illustrating the operation of masking feature channels with mask channels of the second example embodiment of the present disclosure.

Next, the masking operator 12 performs a masking operation on the values in the feature channels MF1 according to the values in the mask channels MC1 (step S3 in FIG. 5). For example, if the value of a pixel in the mask channel MC1 is less than a threshold value, the value of the pixel in the feature channels MF1 in the same position as the position of the pixel in the mask channel MC1 is considered redundant and suppressed (e.g. making the value zero, etc.). In another example, one pixel in the mask channel can be used to mask a region of feature channels (more than one pixel in the feature channels). FIG. 7 illustrates the masking operation. The hatched area of the mask channel MC1 in FIG. 7 is a masked region and corresponds to the positions of feature channels' pixels whose computation can be omitted, while the unhatched area of the mask channel MF1 in FIG. 7 is an unmasked region. The mask is applied to the feature channels MF1 and the output of this step is the masked feature channels. The masked regions of the masked feature channels are redundant and masked, and the computations related to those pixels are omitted. For example, those pixels are background areas. The unmasked region indicates the pixels whose computations are considered meaningful and the values of these pixels are the same as those of the feature channels. If there is more than one mask channel MC1, the masking operator 12 uses those mask channels MC1 together by using, but is not limited to, 'AND', 'OR', 'SUM' operation.

Figure 8:
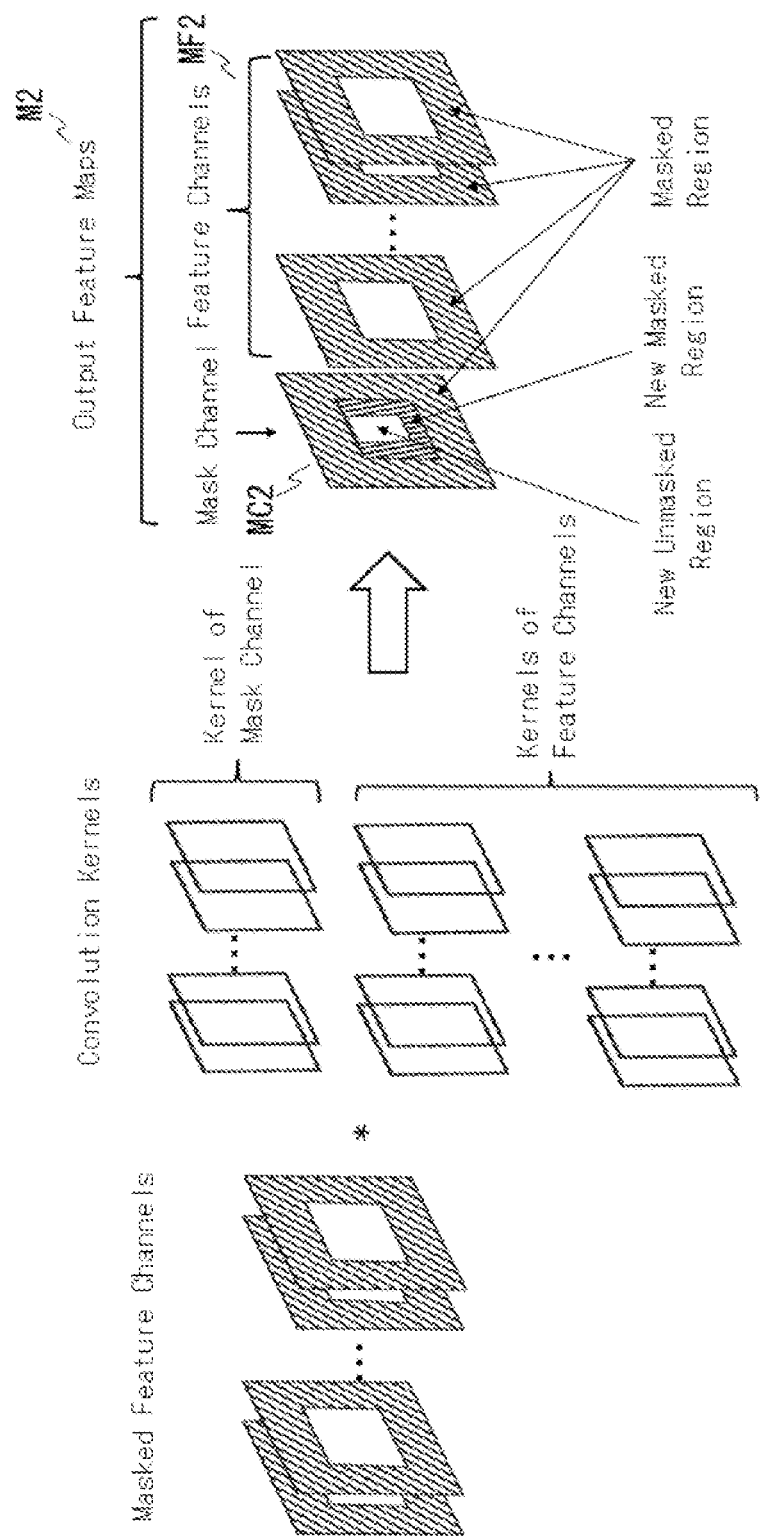
FIG. 8 is a figure illustrating the operation of convolution of the second example embodiment of the present disclosure.

Finally, the convolution operator 13 performs a convolution operation between the masked feature channels and the convolution kernels (also known as filters or weights) in the convolution operator 13 (step S4 in FIG. 5) as shown in FIG. 8. The convolution kernels include kernel of mask channel and kernels of feature channels. This step generates the output feature maps M2. The convolution between the masked feature channels and the kernel of mask channel generates the mask channel MC2 of the output feature maps M2. The mask channel MC2 of the output feature maps M2 has a new masked region computed in the process. This new masked region in the output feature maps M2 is shown in FIG. 8. Furthermore, the mask channel MC2 of the output feature maps M2 has a new unmasked region, which is smaller than that of the mask channel MC1 of the input feature maps M1. The new unmasked region is also shown in FIG. 8. In addition, the convolution operator 13 generates the feature channels MF2 in the output feature maps M2 by the convolution operation between the masked feature channels and the kernels of feature channels.

The convolution between the masked feature channels and the kernels of feature channels generates the feature channels of the output feature maps M2. The convolution related to the masked region of the input masked feature maps is omitted for both the mask channels of the output feature maps M2 and the feature channels of the output feature maps M2, and hence, the output feature maps M2 corresponding to that region is filled with, but is not limited to, the value '0' or the value of the input feature maps M1 in the same region as the region of the masked region in the mask channel MC1. This filled region in the output feature maps M2 is shown as a masked region in FIG. 8. If there is more than one mask channel MC1, each of the masking channels is generated by a respective kernel of mask channel.

(Description of Effect)

Next, the effect of the present example embodiment is described. As mentioned above, the masking operator 12 uses mask channel MC1 in input feature maps M1 to mask pixels of feature channels MF1 in the input feature maps M1 and generate masked feature channels, which are used for the convolution operation. Therefore, since redundant areas of the masked feature channels are masked, the computations related to those pixels are omitted. This helps to reduce redundant computation in the CNN.

As mentioned above, the method disclosed in NPL 1 has two problems: (1) the halting score is computed with extra matrix multiplication or convolution layers within the CNN, which is compute-intensive and consumes function call overhead; (2) it cannot omit the background area that has complicated details. However, the present example embodiment is configured in such a manner that the RGM convolution layer 10 uses the input feature maps M1 to omit the redundant operation and the convolution kernels includes the kernel of mask channel for mask channels MC1. Therefore, it is possible to omit the MAC operations of the convolution without an extra matrix multiplication or convolution layer that incurs a function call overhead. In addition, the overhead for deciding which computation to reduce becomes small. The RGM convolution layer can be applied to all of the CNNs, such as VGG, ResNet, etc. Although this can reduce the number of the computations, it can still make the pixel level of the result fine-grained or medium-grained. In addition, the present disclosure omits the layer's MAC operation with the decision within the input feature maps and the decision of the next layer is computed within the layer.

In addition, the decision for omitting the computation is computed within the RGM convolution layer, not a separate layer. Therefore, the number or the scale of the computation overhead can be reduced by the above-mentioned operations.

Furthermore, since the example embodiment is configured in such a manner that it analyses each image (frame) and generates a decision for each image (frame) individually, it is possible to omit the dynamic background.

Third Example Embodiment

Next, a third example embodiment of the present disclosure illustrates the usage of one or a plurality of RGM convolution layers in the CNN, called Region-Masked CNN (RGM-CNN). This RGM-CNN is used in place of the CNN, which is processed by the means in FIG. 13. It is described referring to the accompanying drawings.

(Explanation of Structure)

Figure 9A:
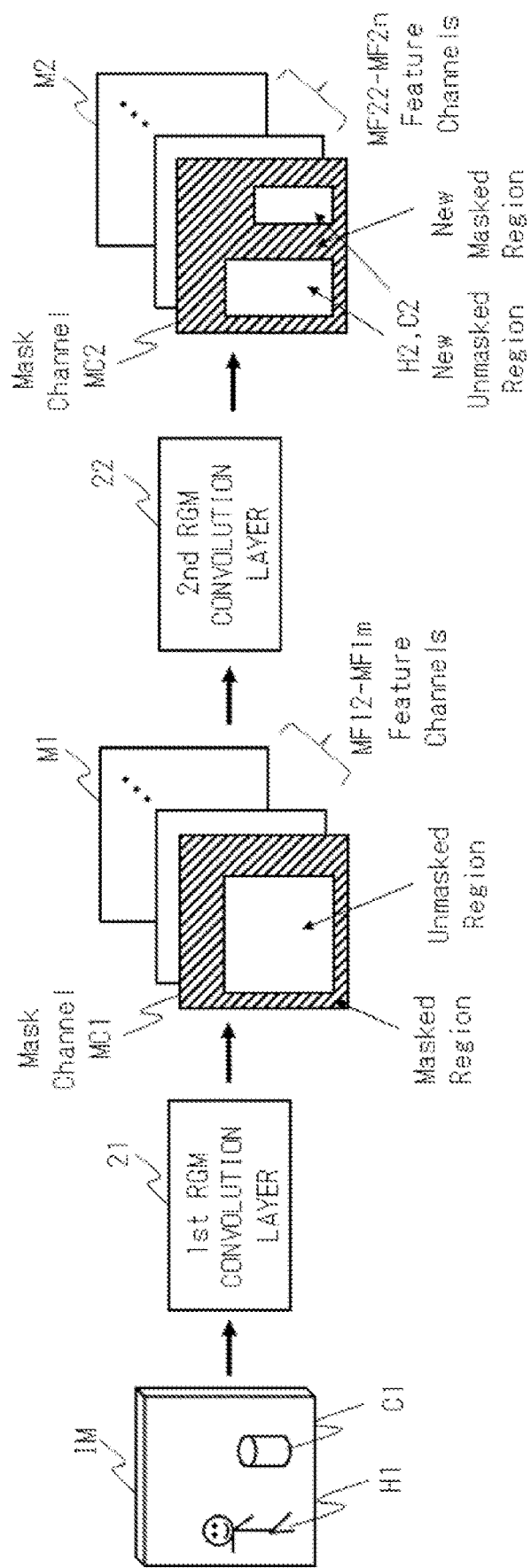
FIG. 9A is a figure illustrating the operation of a third example embodiment of the present disclosure.

Referring to FIGS. 9A and 9B, the RGM-CNN includes one or a plurality of the RGM convolution layers. Each RGM convolution layer functions as a processing layer which processes its input data. The input image IM is a single or multi-channel image data. Given that there are two objects in this image, a human H1 and a cylinder C1, the forward propagation analyses not only the location and class of the objects, but also the redundant computations that can be omitted, such as background and etc.

Since the input image IM does not have a mask channel, the first RGM convolution layer 21 (previous processing layer; generating layer) generates one or a plurality of feature maps M1, in which one of the feature maps M1 is a mask channel MC1 and the others are feature channels MF12 through MF1$m$, from the input image IM. The feature maps M1 corresponds to the input feature maps M1 in the second example embodiment. The mask channel MC1 has a masked region and an unmasked region, which are shown respectively as a hatched area and an unhatched area in FIG. 9A.

The second RGM convolution layer 22 uses the mask channel MC1, which indicates the position of redundant pixels, to omit the computation of the feature channels MF12 through MF1$m$. The second RGM convolution layer 22 corresponds to the RGM convolution layer 10 in the second example embodiment.

FIG. 9A illustrates the effects of the mask channel on the feature channels, with the masked region indicating the pixels whose computation will be omitted. Then, the second RGM convolution layer 22 generates one or a plurality of feature maps M2, in which one of the feature maps is a mask channel MC2 and the others are feature channels MF22 through MF2$n$, from the masked feature channels MF12 through MF1$m$. The mask channel MC2 has new unmasked regions H2, C2 and a new masked region, which are respectively shown as an unhatched area and a hatched area in FIG. 9A. The new unmasked regions H2, C2 respectively correspond to the area of the human H1 and the cylinder C1 in the input image IM, and these new unmasked regions H2, C2 are smaller than the unmasked region of the mask channel MC1. The mask channel MC2 indicates the position of redundant pixels, to omit the computation of the feature channels MF22 through MF2$n$.

The next RGM convolution layer operates in a manner similar to that of the second RGM convolution layer 22 throughout the RGM-CNN. Finally, the last (mth) RGM convolution layer 23 (next processing layer) generates one or a plurality of feature maps FM consisting of only feature channels from the masked feature maps M3. The feature maps FM can be interpreted as being input feature maps to other following layers in order to generate a prediction of the input image IM or the prediction itself.

In addition, the structure illustrated in FIGS. 9A and 9B can be modified as follows. The RGM-CNN may include layers other than those described above, such as a convolution layer, pooling layer, batch normalization layer, non-linear activation layer, fully-connected layer, etc. The input image may contain a mask channel generated by preprocessing means by a method other than that described above, such as user-defined or background subtraction, etc.

(Description of Operation)

Figure 10:
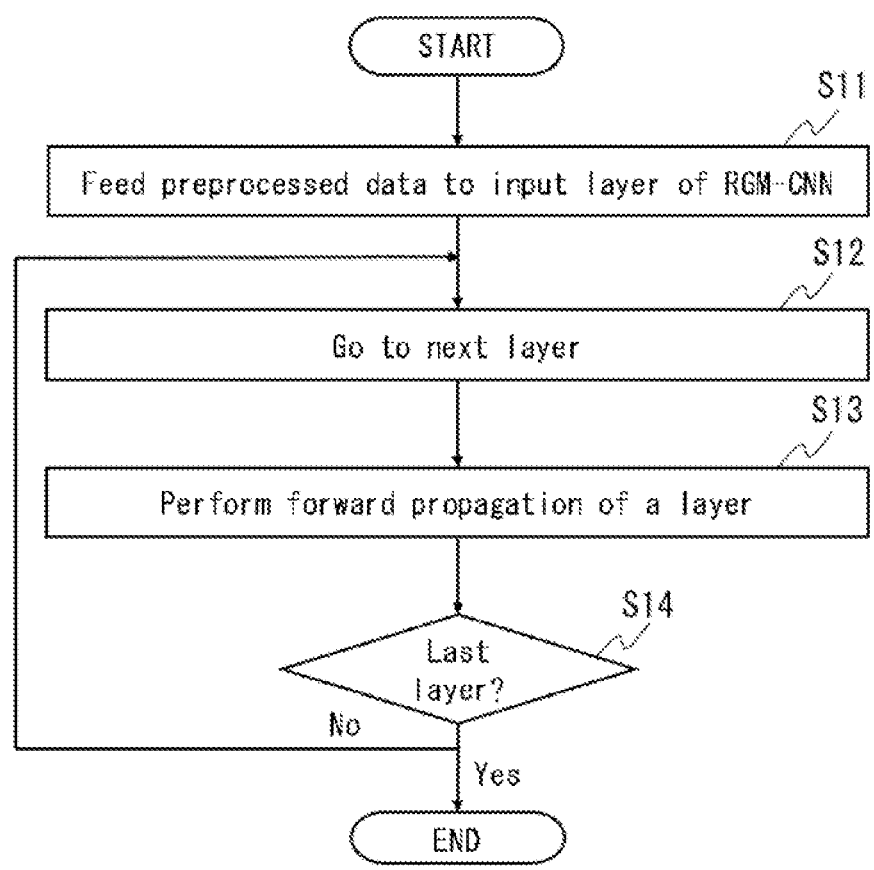
FIG. 10 is a flow diagram illustrating the flow of the operation of the third example embodiment.

Next, referring to the flowcharts in FIG. 10, the general operation of the present example embodiment is elaborated.

First, the forward propagation of the RGM-CNN starts by feeding an image to the input layer of the RGM-CNN (step S11 in FIG. 10). Then, the forward propagation processing proceeds to the next layer (step S12 in FIG. 10). The processing depends on the type of each layer (step S13 in FIG. 10) and proceeds layer by layer. If the layer is the RGM convolution layer, the forward propagation of the layer proceeds according to the second example embodiment. If the layer is another type of layer, such as a convolution layer, a batch normalization layer, etc., the forward propagation proceeds according to the type of the layer. Finally, steps S12 to S14 in FIG. 10 are iterated until the last layer of the RGM-CNN processing (step S14 in FIG. 10).

In addition, these above steps of the flowcharts in FIG. 10 can be processed in a pipeline manner.

(Description of Effect)

As mentioned above, the RGM convolution layer uses channels within input feature maps to omit the spatially redundant computations of the convolution layer and generate output feature maps, which include mask channels that can be used to omit the computation of the next layer and the feature channels.

Fourth Example Embodiment

In order to effectively omit the computation using the mask channels of the feature maps, the kernels of the mask channels should be properly trained, so that they learn a redundant or meaningful area of the feature channels of the feature maps. A fourth embodiment describes an example of the system for training the RGM-CNN.

(Explanation of Structure)

Figure 11:
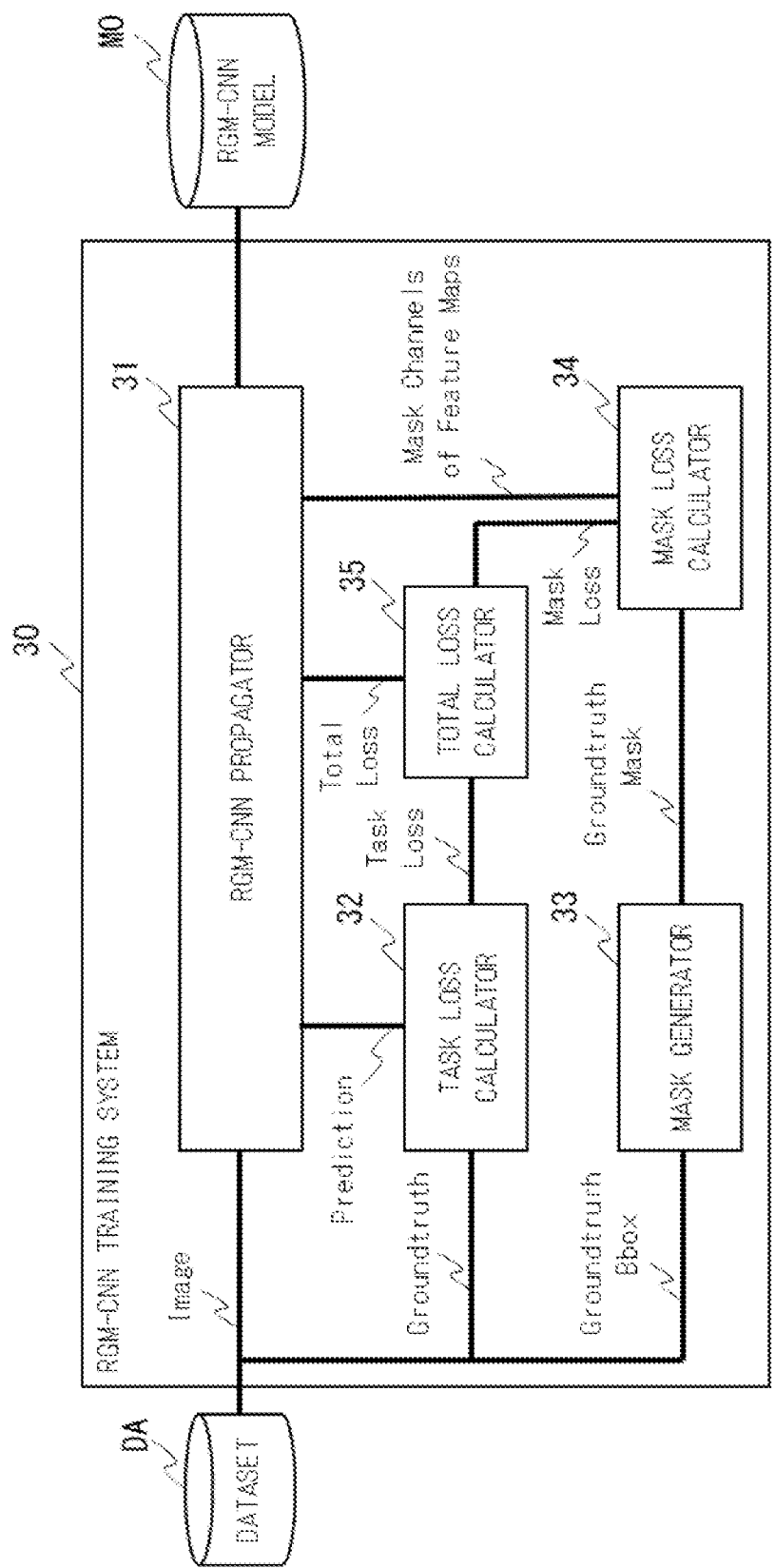
FIG. 11 is a configuration diagram illustrating the structure of a fourth example embodiment of the present disclosure.

Referring to FIG. 11, the fourth example embodiment of the present disclosure is described below. The RGM-CNN training system 30 includes a RGM-CNN propagator 31, a task loss calculator 32, a mask generator 33, a mask loss calculator 34, and a total loss calculator 35. The RGM-CNN propagator 31 includes the RGM-CNN disclosed in the third example embodiment and functions as training direction calculation means and weight update means. The RGM-CNN training system 30 can be implemented using, but is not limited to, a general-purpose processor system or a specific circuit, such as Graphic Processing Unit (GPU), Application-Specific Integrated Circuit (ASIC) and Application-Specific Instruction set Processor (ASIP), and a reconfigurable devices, such as Field Programmable Gate Array (FPGA).

The RGM-CNN training system 30 trains the parameters of layers within RGM-CNN. For the RGM convolution layers within the RGM-CNN, this system trains kernels of mask and feature channels. An input DA is a dataset, which includes one or a plurality of image and groundtruth. The groundtruth means the correct prediction data of each image. It could be BBox and/or class of each object in the image, a pixel-wise class of each object, etc. An output MO is a RGM-CNN model, which includes the sequence of layers and the values of the parameters (kernels, etc.) of the RGM-CNN.

The RGM-CNN training system 30 is capable of training the kernels of mask and feature channels of RGM convolution layers, so that the mask channels can be used to omit the redundant area of the feature maps.

The structure shown in FIG. 11 can be performed by software and hardware installed in an information processing apparatus or system. The dataset DA and the RGM-CNN model MO can be stored in a temporary or permanent memory device in the information processing apparatus or system. However, the dataset DA can instead be installed outside of the information processing apparatus or system, and the information processing apparatus or system can send the RGM-CNN model MO to another information processing apparatus or system. The RGM-CNN training system 30 can be composed by a collaboration of software and hardware.

The above-mentioned means generally operate as follows.

The RGM-CNN propagator 31 performs forward propagation, calculate training direction and weight update.

The task loss calculator 32 calculates the task loss from a prediction and groundtruth.

The mask generator 33 generates groundtruth mask from the groundtruth BBox.

The mask loss calculator 34 calculates a mask loss from the generated groundtruth mask and the mask channels of the feature maps from forward propagation.

The total loss calculator 35 calculates the total loss of the RGM-CNN from the task loss and the mask loss to be used in the training direction calculation.

(Description of Operation)

Next, referring to the flowchart in FIG. 12, the general operation of the present example embodiment is described below.

Figure 12:
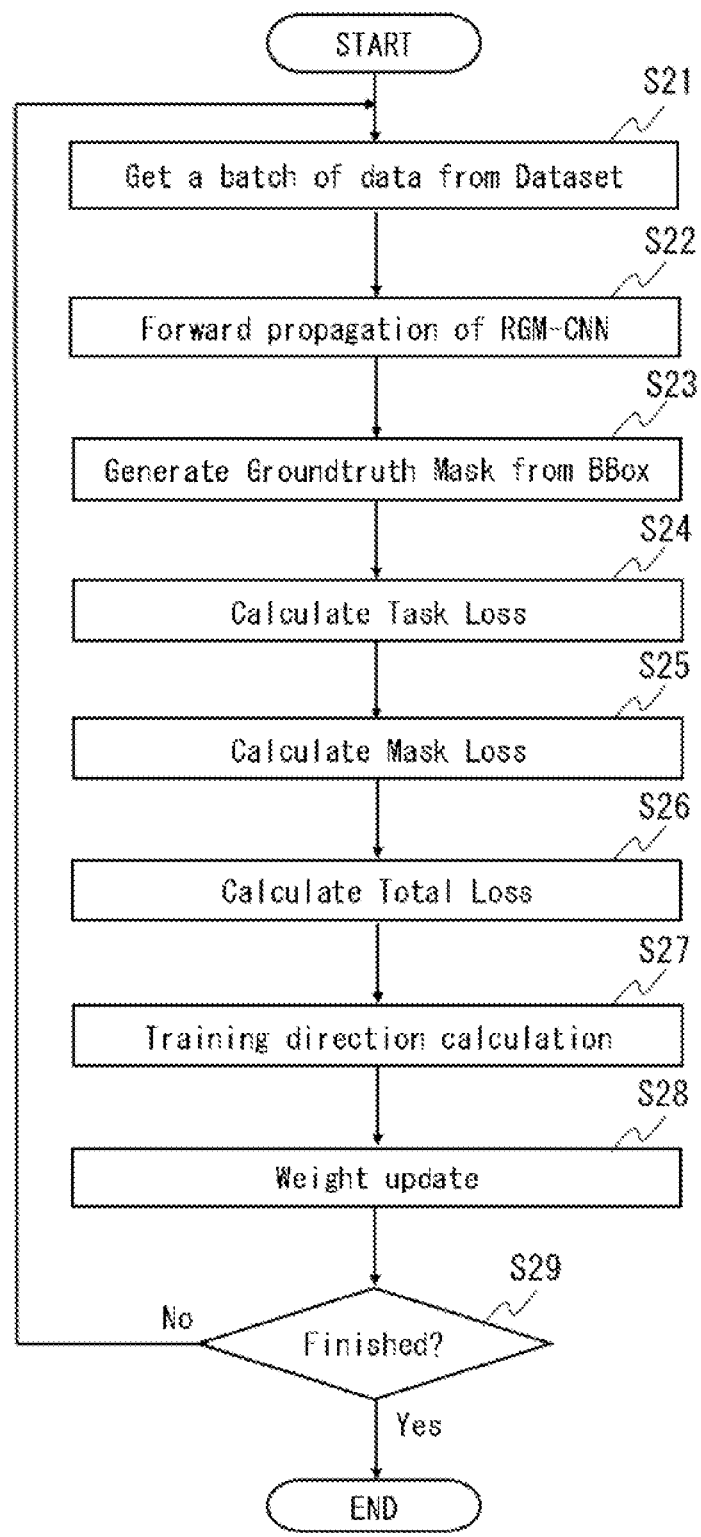
FIG. 12 is a flow diagram illustrating the flow of the operation of the fourth example embodiment.

First, the RGM-CNN propagator 31 obtains a batch (one or a plurality of images/frames) of data from the dataset DA (step S21 in FIG. 12) and performs forward propagation using the image data as input of the RGM-CNN (step S22 in FIG. 12). The forward propagation proceeds as described in the third example embodiment. It yields the prediction to the task loss calculator 32. For example, the prediction of the object detection task includes BBoxes and classes of the objects in the input image. In addition to the prediction that is the result of the typical forward propagation, the forward propagation process of the RGM-CNN also yields mask channels of feature maps of the intermediate RGM convolution layers to the mask loss calculator 34. The feature maps correspond to the output feature maps in the first or the second example embodiment.

Next, the mask generator 33 obtains the groundtruth BBox data from the dataset DA and generates one or a plurality of groundtruth masks of the image (step S23 in FIG. 12). The size of each groundtruth mask corresponds to the size of the feature maps of the RGM convolution layers. The groundtruth BBox is scaled to match the size of the mask and flipped to match the transformation of the input image. The pixels of the groundtruth mask within the groundtruth BBoxes are considered meaningful for the computation, and hence marked with the value that indicates "compute", for example the value 1. On the contrary, the pixels of the groundtruth mask outside the groundtruth BBoxes are considered redundant for the computation, and hence marked with the value that indicates "omit", for example the value 0. This step yields the groundtruth mask to the mask loss calculator 34.

In addition, the procedure of the step S22 and the S23 can be done in concurrent. Furthermore, before the RGM-CNN propagator 31 performs the forward propagation (step S22), the mask generator 33 may obtain the groundtruth BBox data from the dataset DA and generates the groundtruth masks (step S23).

Then, the task loss calculator 32 calculates task loss (step S24 in FIG. 12). For example, the task loss of object detection is a typical loss calculated from the groundtruth BBox/Classes and the BBox/Classes of the prediction. Examples of the object detection loss are a focal loss, a ssd loss, etc. The focal loss is shown in "Focal Loss for Dense Object Detection", Lin et al., ICCV 2017, 2017. The ssd loss is shown in "SSD: Single Shot MultiBox Detector", Liu et al., ECCV 2016, 2016.

For the RGM convolution layers, the mask loss calculator 34 computes the mask loss by comparing the mask channels of feature maps, which are generated from the RGM-CNN during the forward propagation, with the groundtruth mask (step S25 in FIG. 12). For example, the mask loss function can be, but is not limited to, an element-wise value comparison such as a mean square error function.

In addition, the procedure of the step S24 and the S25 can be done in concurrent. Furthermore, before the task loss calculator 32 calculates task loss (step S24), the mask loss calculator 34 may compute the mask loss (step S25).

Further, the total loss calculator 35 calculates the total loss from the task loss and mask loss (step S26 in FIG. 12). For example, the total loss can be calculated from the summation of the task loss and mask loss with a coefficient as shown in the following equation:

$$L = \alpha L_T + \beta L_M$$

L, $L_T$, $L_M$ are total loss, task loss and mask loss, respectively. The $\alpha$ and $\beta$ are the coefficient values to specify the weight of each Loss for optimizing the total loss in step S27 in FIG. 12.

Finally, the RGM-CNN propagator 31 calculates a training direction (gradient) (step S27 in FIG. 12). The training direction calculation depends on the training algorithm. For example, if the training algorithm is a gradient descent family, the training direction calculation performs backward propagation (computing gradient) from the total loss. The training algorithm can also be the Newton's method, conjugate gradient, etc. In step S28 in FIG. 12, the RGM-CNN propagator 31 performs weight update according to the training direction. When the training is finished (step S29 in FIG. 12), the RGM-CNN propagator 31 gives the RGM-CNN model MO as output. Otherwise, the training continues from step S21 in FIG. 12.

(Description of Effect)

Next, the effect of the present example embodiment is described.

As the present example embodiment is configured in such a manner that the system 30 uses the groundtruth BBox of the objects to train the kernels of the mask channels, it is possible to omit the computation of background with complicated details.

The present disclosure trains the RGM convolution layer to decide which pixels to omit using the location of objects of the groundtruth BBox. During the inference processing, the RGM convolution layer omit the pixels statistically according to the mentioned object-based training. In other words, training for the decision for omitting the computation is based on the location of objects of the groundtruth BBox.

Next, a configuration example of the information processing apparatus explained in the above-described plurality of embodiments is explained hereinafter with reference to FIG. 16.

Figure 16:
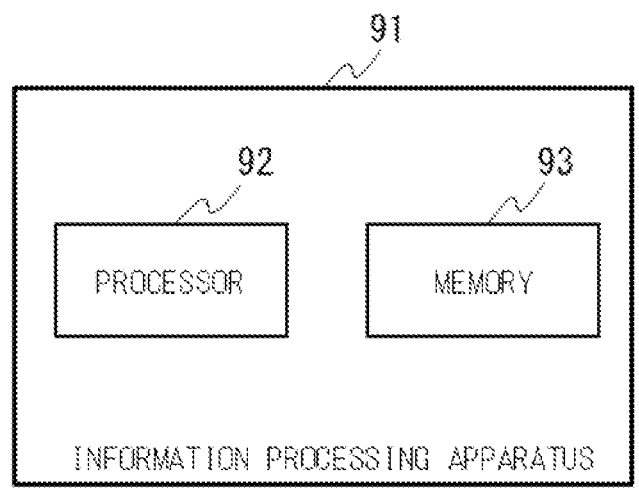
FIG. 16 is a configuration diagram of an information processing apparatus according to a respective embodiment.

FIG. 16 is a block diagram showing a configuration example of the information processing apparatus. As shown in FIG. 16, the information processing apparatus 91 includes a processor 92 and a memory 93.

The processor 92 performs processes performed by the information processing apparatus 91 explained with reference to the sequence diagrams and the flowcharts in the above-described embodiments by loading software (a computer program) from the memory 93 and executing the loaded software. The processor 92 may be, for example, a microprocessor, an MPU (Micro Processing Unit), or a CPU (Central Processing Unit). The processor 92 may include a plurality of processors.

The memory 93 is formed by a combination of a volatile memory and a nonvolatile memory. The memory 93 may include a storage disposed apart from the processor 92. In this case, the processor 92 may access the memory 93 through an I/O interface (not shown).

In the example shown in FIG. 16, the memory 93 is used to store a group of software modules. The processor 92 can perform processes performed by the information processing apparatus explained in the above-described embodiments by reading the group of software modules from the memory 93 and executing the read software modules.

As explained above with reference to FIG. 16, each of the processors included in the information processing apparatus in the above-described embodiments executes one or a plurality of programs including a group of instructions to cause a computer to perform an algorithm explained above with reference to the drawings.

Furthermore, the information processing apparatus 91 may include the network interface. The network interface is used for communication with other network node apparatuses forming a communication system. The network interface may include, for example, a network interface card (NIC) in conformity with IEEE 802.3 series. The information processing apparatus 91 may receive the input feature maps or send the output feature maps using the network interface.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described embodiments and can be modified as appropriate without departing from the spirit and scope of the present disclosure.

REFERENCE SIGNS LIST 1 information processing apparatus
2 masking operator
3 convolution operator
10 Region-Masked (RGM) convolution layer
11 splitter
12 masking operator
13 convolution operator
14 convolution kernel storage
15 convolutor
21 first RGM convolution layer
22 second RGM convolution layer
23 mth RGM convolution layer
30 RGM-CNN training system
31 RGM-CNN propagator
32 task loss calculator
33 mask generator
34 mask loss calculator
35 total loss calculator
91 information processing apparatus
92 processor
93 memory

The invention claimed is:

1. An information processing apparatus comprising at least one memory configured to store an instruction, and at least one processor configured to execute the instruction to:
use at least one mask channel derived from one or more input feature maps of a set to mask pixels of at least one feature channel derived from the one or more input feature maps of the set and to generate at least one masked feature channel;
perform a convolution operation between the at least one masked feature channel and convolution kernels to generate output feature maps;
calculate task loss from a prediction and groundtruth data of an image;
calculate a mask loss from mask channels of the output feature maps and groundtruth mask of the image;
calculate a total loss from the task loss and the mask loss; and
train a convolutional neural network based on the total loss to obtain an updated convolutional neural network.

2. The information processing apparatus according to claim 1, wherein
the at least one processor is further configured to split the input feature maps into the mask channels and the at least one feature channel.

3. The information processing apparatus according to claim 1, wherein
the at least one processor is further configured to process the output feature maps.

4. The information processing apparatus according to claim 1, wherein
the at least one processor is further configured to generate the input feature maps using an image data.

5. The information processing apparatus according to claim 1,
wherein the at least one processor is further configured to:
store the convolution kernels in convolution kernel storage, the convolution kernels including one or a plurality of kernels of mask channels for generating mask channels of the output feature maps and one or a plurality of kernels of feature channels for generating feature channels of the output feature maps; and
perform convolution with the kernels in the convolution kernel storage across the masked feature channels.

6. The information processing apparatus according to claim 1, wherein
the output feature maps are predictions of the image.

7. The information processing apparatus according to claim 1,
wherein the at least one processor is further configured to:
generate groundtruth mask from groundtruth BBox data; and
calculate the mask loss from the generated groundtruth mask and the mask channels of the output feature maps.

8. An information processing method comprising:
using at least one mask channel derived from one or more input feature maps of a set to mask pixels of at least one feature channel derived from the one or more input feature maps of the set and to generate at least one masked feature channel;
performing a convolution operation between the at least one masked feature channel and convolution kernels to generate output feature maps;
calculating task loss from a prediction and groundtruth data of an image;
calculating a mask loss from mask channels of the output feature maps and groundtruth mask of the image;
calculating a total loss from the task loss and the mask loss; and
training a convolutional neural network based on the total loss to obtain an updated convolutional neural network.

9. A non-transitory computer readable medium storing a program for causing a computer to execute:
using at least one mask channel derived from one or more input feature maps of a set to mask pixels of at least one feature channel derived from the one or more input feature maps of the set and to generate at least one masked feature channel;
performing a convolution operation between the at least one masked feature channel and convolution kernels to generate output feature maps;
calculating task loss from a prediction and groundtruth data of an image;
calculating a mask loss from mask channels of the output feature maps and groundtruth mask of the image;

calculating a total loss from the task loss and the mask loss; and training a convolutional neural network based on the total loss to obtain an updated convolutional neural network.

* * * * *